United States Patent
Frosst (10) Patent No.: US 10,521,804 B2
(45) Date of Patent: *Dec. 31, 2019

(54) DRIVING CUSTOMER SERVICE INTERACTIONS ON SOCIAL MEDIA

(71) Applicant: salesforce.com, inc., San Francisco, CA (US)

(72) Inventor: Ian Frosst, Nova Scotia (CA)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,412

(22) Filed: Dec. 27, 2018

(65) Prior Publication Data

US 2019/0156347 A1    May 23, 2019

Related U.S. Application Data

(63) Continuation of application No. 15/195,499, filed on Jun. 28, 2016, now Pat. No. 10,204,345.

(51) Int. Cl.
| | | |
|---|---|---|
| *G06F 15/16* | (2006.01) | |
| *G06Q 30/00* | (2012.01) | |
| *G06Q 50/00* | (2012.01) | |
| *G06F 16/951* | (2019.01) | |

(52) U.S. Cl.
CPC ......... *G06Q 30/016* (2013.01); *G06F 16/951* (2019.01); *G06Q 50/01* (2013.01)

(58) Field of Classification Search
CPC ..... G06Q 30/016; G06Q 50/01; G06F 16/951
USPC ...................................................... 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Google Plus Users", Google+Ripples; Oct. 31, 2011; 3 pages.

*Primary Examiner* — Alan S Chou
(74) *Attorney, Agent, or Firm* — Schwabe Williamson & Wyatt, PC (57) ABSTRACT

An interaction manager assigns messages posted on a social media website to a support case in a database system. A support agent may tag a message posted by a user for directing to the support case. The interaction manger assigns the tagged message to the support case and activates a timer to track a time period. During the time period, the interaction manager assigns other messages posted by the same user to the support case. The interaction manager may reset the time period whenever the support agent replies to one of the messages posted by the user or the support agent tags another one of the user messages for directing to the support case. The interaction manager reduces the burden of having to manually review and manage every message posted on the social media website.

20 Claims, 7 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,204,345 B2 * | 2/2019 | Frosst .................. G06Q 30/016 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0016179 A1* | 1/2011 | Bechtel ............... G06Q 10/10 709/205 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0198039 A1* | 8/2013 | Sridharan ............ G06Q 30/016 705/26.44 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0171035 A1* | 6/2014 | Frederick ............. H04W 12/06 455/414.1 |
| 2014/0172992 A1* | 6/2014 | Frederick ............. H04W 12/06 709/206 |
| 2014/0359537 A1 | 12/2014 | Jackobson et al. |
| 2016/0119477 A1* | 4/2016 | Sharpe ................... H04W 4/21 379/265.09 |
| 2016/0142541 A1* | 5/2016 | Sharpe ............... H04M 3/5141 379/92.01 |
| 2017/0111508 A1* | 4/2017 | Sharpe ................... H04W 4/21 |

* cited by examiner

DRIVING CUSTOMER SERVICE INTERACTIONS ON SOCIAL MEDIA

CROSS REFERENCE TO RELATED APPLICATIONS

This present application is a continuation application of U.S. patent application Ser. No. 15/195,499, filed Jun. 28, 2016, the contents of which is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to driving customer service interactions on social media.

BACKGROUND

Companies and individuals may post content on social media websites. For example, a company may post a page including video, images, links, text, etc. announcing a new product or service. Thousands of users may comment on the post. The company may hire an army of agents to create and use customer relationship management (CRM) cases to respond to and manage the user comments. The problem is that most of user comments are noise and do not need CRM cases opened or customer service support.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

Figure 1A:
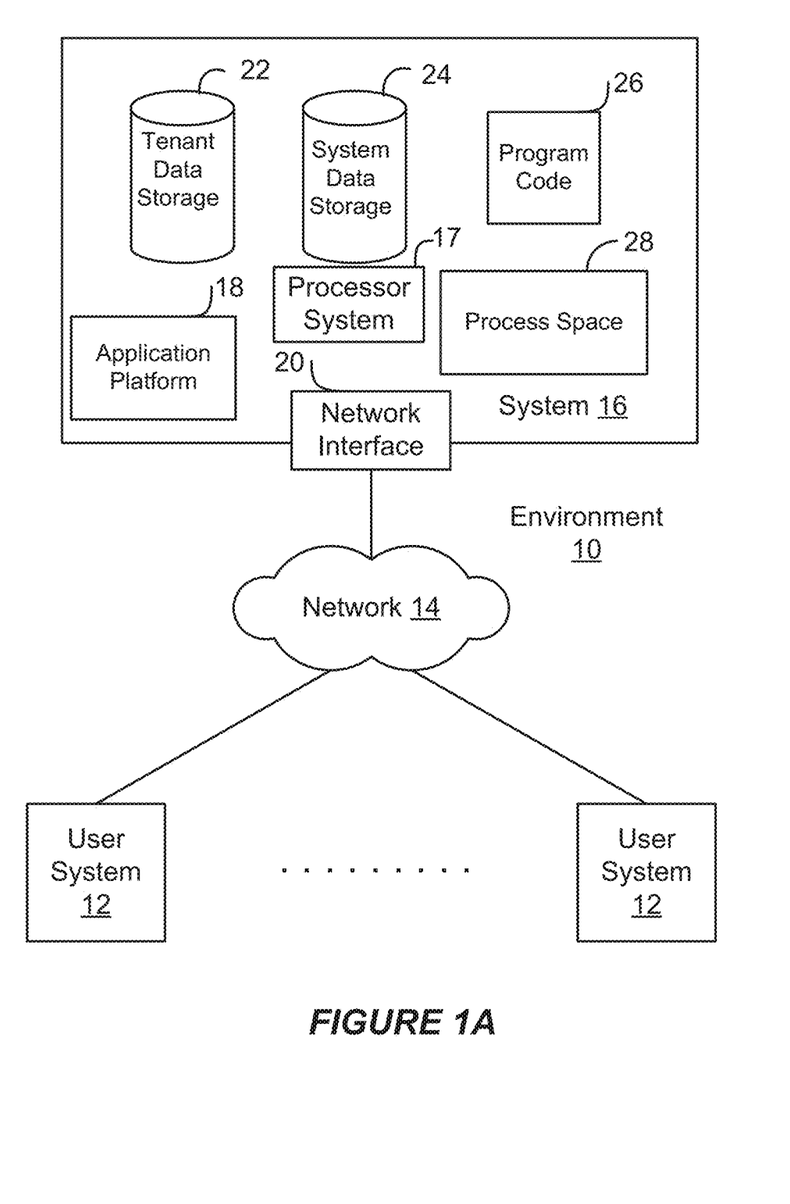
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
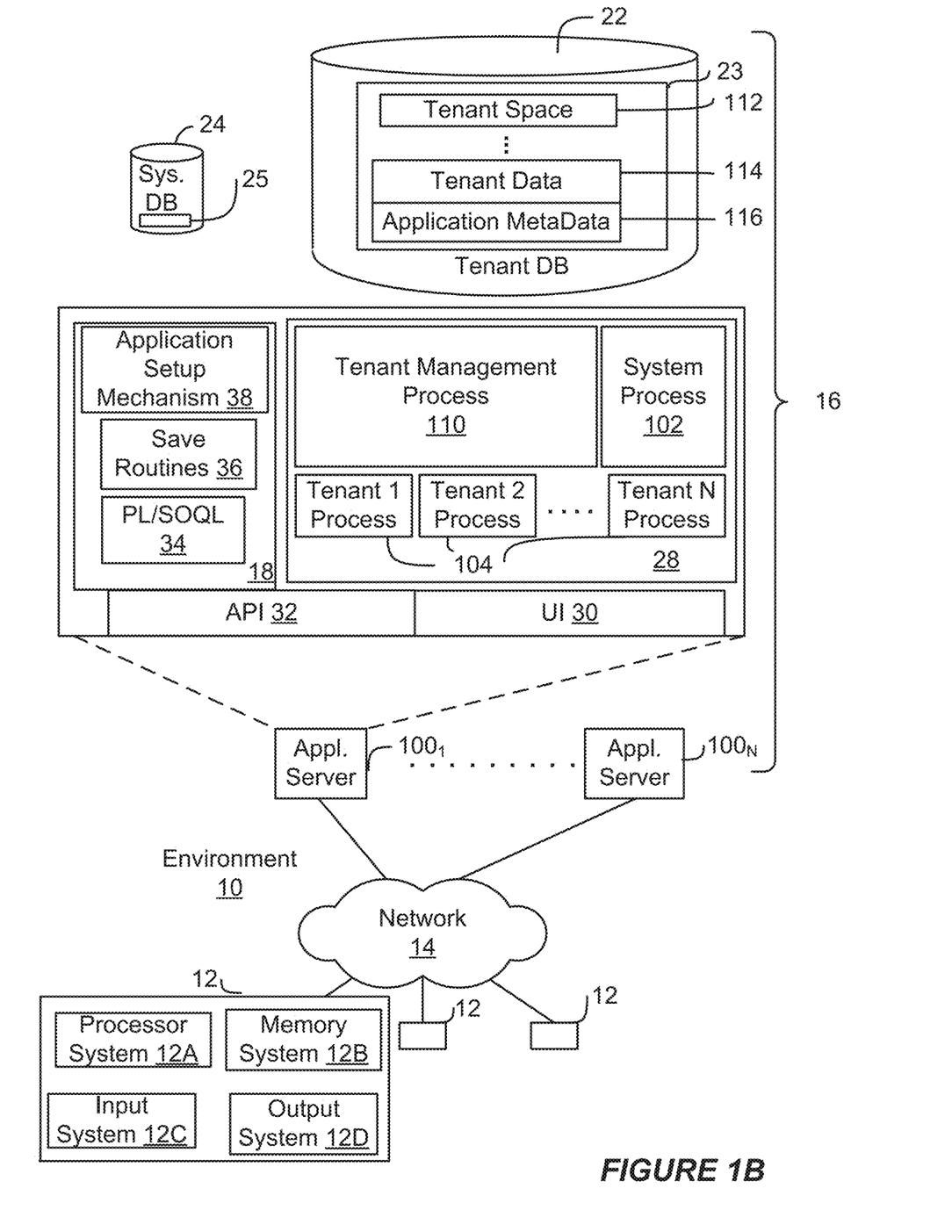
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Driving Customer Service Interactions on Social Media

An interaction manager starts a timer whenever a customer support agent tags a message for a customer support interaction. The interaction manager automatically assigns any messages posted by the same user within a given time window to a support case file. The interaction manager resets the time window each time the support agent replies to the user or the support agent tags another message from the user for another customer support interaction.

The interaction manager prevents customer support agents from having to manually track individual user conversations on social media websites. The interaction manger also prevents the support agents from having to evaluate each piece of social media content for needed support responses. Instead relevant social media content is automatically fed into support cases assigned to the users.

Figure 2:
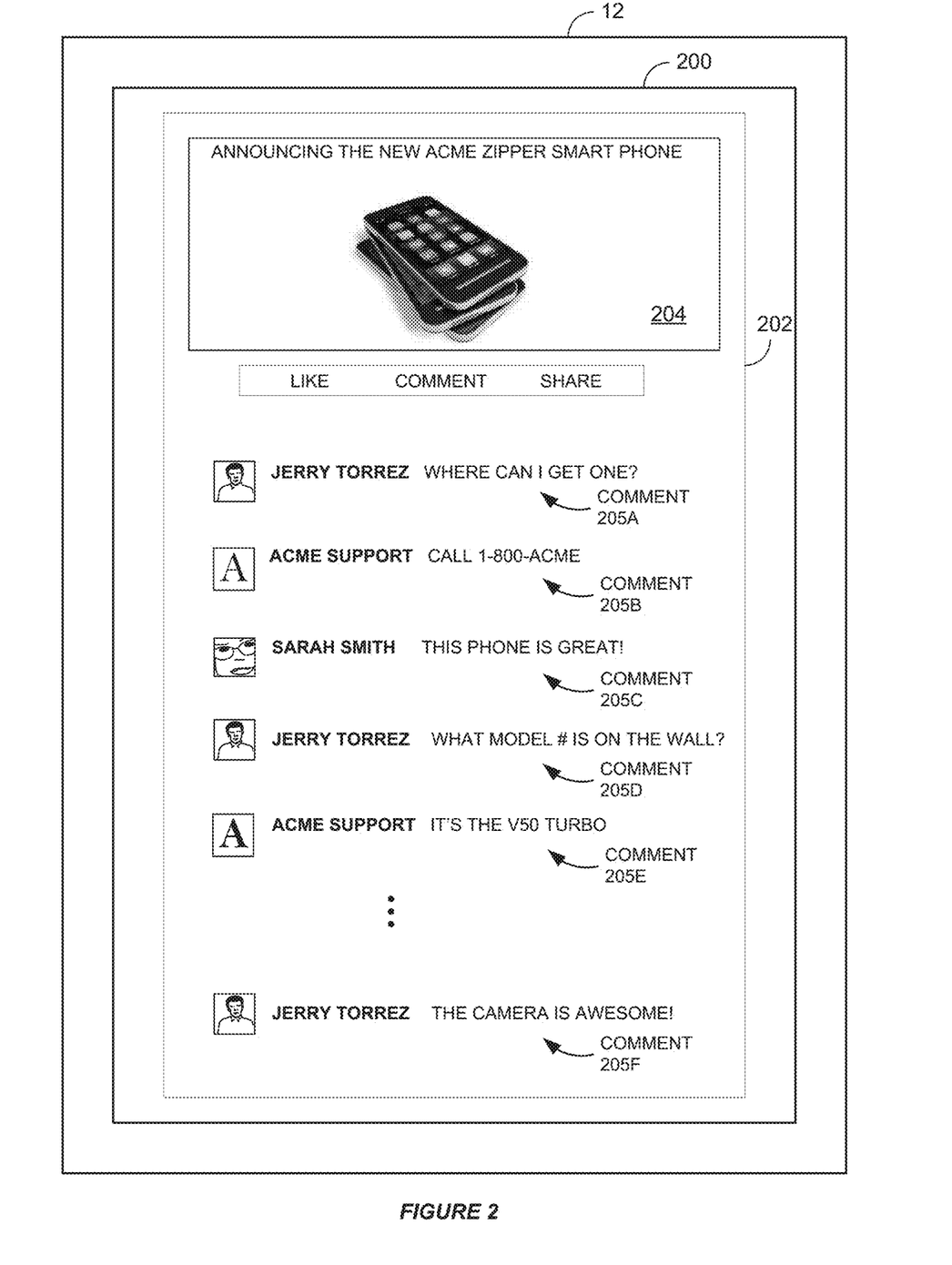
FIG. 2 shows messages posted on a social media website.

FIG. 2 shows user system 12 as described above displaying social media 202 posted on a social media website. User system 12 may operate a user interface 200, such as a web browser, for displaying social media 202. Social media 202 may include any data, message, video, audio, text, comment, reply, link, or the like, or any combination thereof, posted and displayed on a website.

In one example, social media 202 may include a page 204 posted by a company or brand on a social media account. In this example, the company may sell electronic equipment and may announce, in page 204, the availability of a new smart phone. This of course is just one example, and any company, user, or other entity may post any information on any social media website.

Multiple users may post comments on the website. For example, a first user Jerry Torrez may post a comment 205A asking where to get the new smart phone. A second user Sarah Smith may post a comment 205C asking how to operate the new smart phone.

The company associated with the new smart phone may employ support agents to respond to certain user comments 205. For example, a support agent may post a reply comment 205B responding to the query by user Jerry Torrez with a toll free phone number for purchasing the new smart phone. User Jerry Torrez may post another comment 205D requesting the model number for the new smart phone. The agent may post another reply comment 205E responding to the second query by Jerry Torrez in comment 205D. After a time period 207, Jerry Torrez may post another comment 205F.

The social media website may display thousands of additional comments 205 from thousands of other users. It may be difficult for the support agent to monitor all of the different comments 205 posted by all of the different users. The support agent may try and create separate support case files for one-on-one communications with the different users. However, there may be too many comments 205 to create separate case files for each user.

The support agents may not need to interact with all of users. For example, comment 205C posted by user Sarah Smith indicates she likes the new Acme phone. Since comment 205C is not a question or complaint, a support agent may not need to respond or create a case file for Sarah Smith.

The support agent may continually monitor comments 205. For example, user Jerry Torrez may continue to ask the support agent multiple different questions that each warrants a separate reply. However, at some point, the user may stop posting comments that require support agent replies. For example, comment 205F posted later by Jerry Torrez may no longer include a question or complaint that warrants a reply by the support agent.

Figure 3:
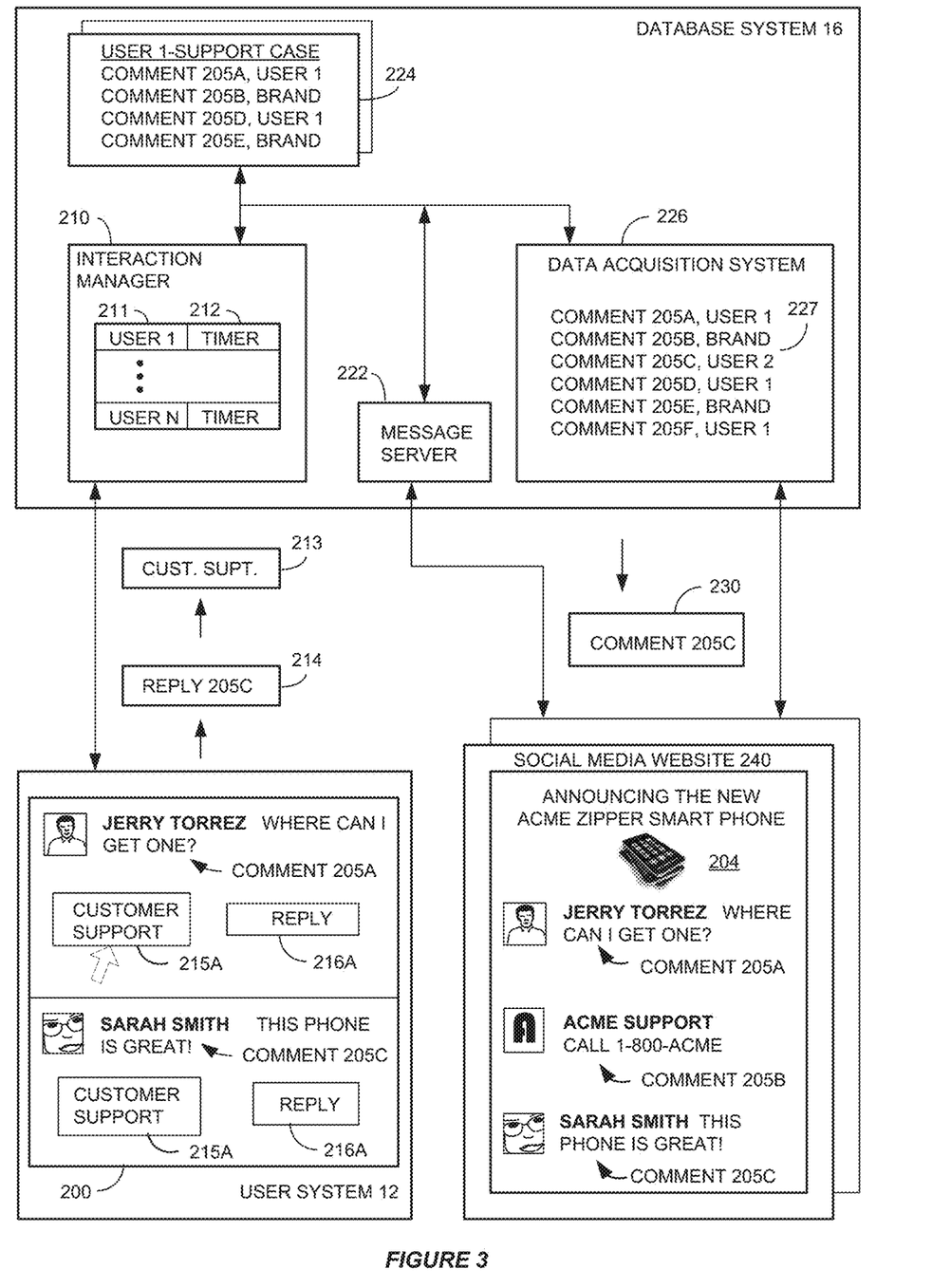
FIG. 3 shows an interaction manager that directs tagged messages to a support case.

FIG. 3 depicts an example interaction manager 210 that automatically directs comments from different users into associated support cases and then manages the comments in the support cases. Interaction manager 210 may operate within database system 16 described above and may include any combination of software and/or hardware. Interaction manager 210 also may operate in conjunction with other software tools, such as other customer relationship management (CRM) software applications or any other cloud computing application that manages client communications.

A data acquisition system 226 may download messages from social media websites 240 into database system 16. For example, data acquisition system 226 may use an application program interface (API) to copy all of the messages and other metadata from a company account on social media website 240, including comments 205 posted on page 204. Data acquisition system 226 may create replications 227 of social media for any social media account on any number of social media websites 240.

A support agent for the company posting page 204 may access interaction manager 210 via user system 12. Interaction manager 210 may display comments 205 from replicated website content 227 on user interface 200. Interaction manager 210 may display customer support icons 215 and reply icons 216 adjacent to comments 205.

The support agent may select support icon 215A to tag comment 205A posted by user 1 (Jerry Torrez). For example, the agent may decide to respond to comment 205A from user Jerry Torrez asking where to purchase the smart phone. User interface 200 may send a customer support tag 213 to interaction manager 210 in response to the support agent selecting customer support icon 215A. Customer support tag 213 may direct interaction manger 210 to send or assign user 1 comment 205A, and subsequent comments posted by user 1, to user 1 support case 224.

Support case 224 may be a CRM software application that store comments 205 and manage communications between the support agent and a particular user or customer. The support agent may initially create support case 224 or interaction manager 210 may automatically create support case 224 in response to the support agent selecting customer support icon 215A.

Support cases 224 do not specifically have to be software entities. For example, support cases may be simulated simply by assigning the incoming social media posts 227 to support agents, rather than adding the posts 227 to specific support case entities.

Interaction manager 210 then starts automatically sending other comments 205 posted by user 1 into support case 224. For example, interaction manager 210 automatically sends a next user 1 comment 205D to support case 224. By automatically directing user 1 comments into support case 224, interaction manager 210 eliminates the support agent from having to manually search for each comment posted by user 1 that may warrant a reply.

Interaction manager 210 also sets a timer 212 for each tagged user 211 and associated support case 224. Timer 212 is configurable to any time period, such as 1 day, 1 week, 2 weeks, etc. Timer 212 may start counting up or down to the configured time period. At the expiration of the time period/time window, interaction manger 210 may stop feeding user 1 comments into support case file 224.

Interaction manger 210 may reduce noise by no longer sending user 1 comments into support case file 224 after the expiration of timer 212. For example, the support agent may tag user 1 comment 205A for an interaction and then send reply comment 205B. After a certain time period, other comments by user one may no longer warrant replies by the support agent. For example, the support agent may not need to send a reply to user 1 comment 205F. User 1 may have posted comment 205F after expiration of timer 212. Accordingly, interaction manager 210 may not send user 1 comment 205F to support case 224.

Interaction manager 210 may reset timer 212 and the associate time period whenever the support agent tags another user 1 comment with customer support icon 215. For example, the support agent may identify another comment posted by user 1 that warrants a reply. The support agent may again select the customer support icon 215 located next to the other user 1 comment 205. In response to selecting customer support icon 215, interaction manager 210 resets timer 212 and sends the selected user 1 comment to support case 224. Interaction manager 210 then continues to send comments 205 posted by user 1 to support case 224 for a second time period.

Interaction manager 210 also may reset timer 212 whenever the support agent replies to a user 1 comment. For example, the support agent may select reply icon 216A to send a reply comment 205B to user 1 comment 205A. Interaction tool 210 may display a message window (not shown) for the agent to enter text, video, audio, links, documents, or any other type of data into reply comment 205B. The agent may select another icon displayed on user interface 200 to then send a message 214 to interaction tool 210 that includes reply comment 205B.

The timer could be set selectively either longer or shorter, depending on any configurable criteria, such as the user being interacted with being a VIP, or a known spammer. The window in which to automatically identify interactions as valid would be longer or shorter, respectively.

Conversation tool 220 may send reply comment 205B to a message server 222 for forwarding either to social media website 240 and/or to user 1 support case 224. In response to sending reply comment 205B, interaction manger 210 also may reset timer 212. Resetting timer 212 causes interaction manager 210 to continue to send user 1 comments to support case 224 for another reset time period.

The same or different support agents may tag comments for sending to support case 224 and reply to other comments. For example, a first community relationship manager may search social media websites 240 and tag user comments 205 needing customer support. Other support agents then may communicate with the selected users by sending reply comments via support cases 224.

As mentioned above, at some point the user may stop posting comments 205 that warrant support agent replies. For example, after a few reply comments 205B and 205E from the support agent, user 1 may become an advocate and only post positive or general comments, such as comment 205F. Interaction manager 210 stops sending user 1 comments to support case 224 after expiration of the time period set in timer 212. Thus, interaction manager 210 may reduce the number of non-interactive comments "noise" sent to support case 224. Interaction manger 210 would start resending user 1 comments to support case 224 when the support agent retags another user 1 comment with support icon 215 or sends another reply using reply icon 216.

Figure 4:
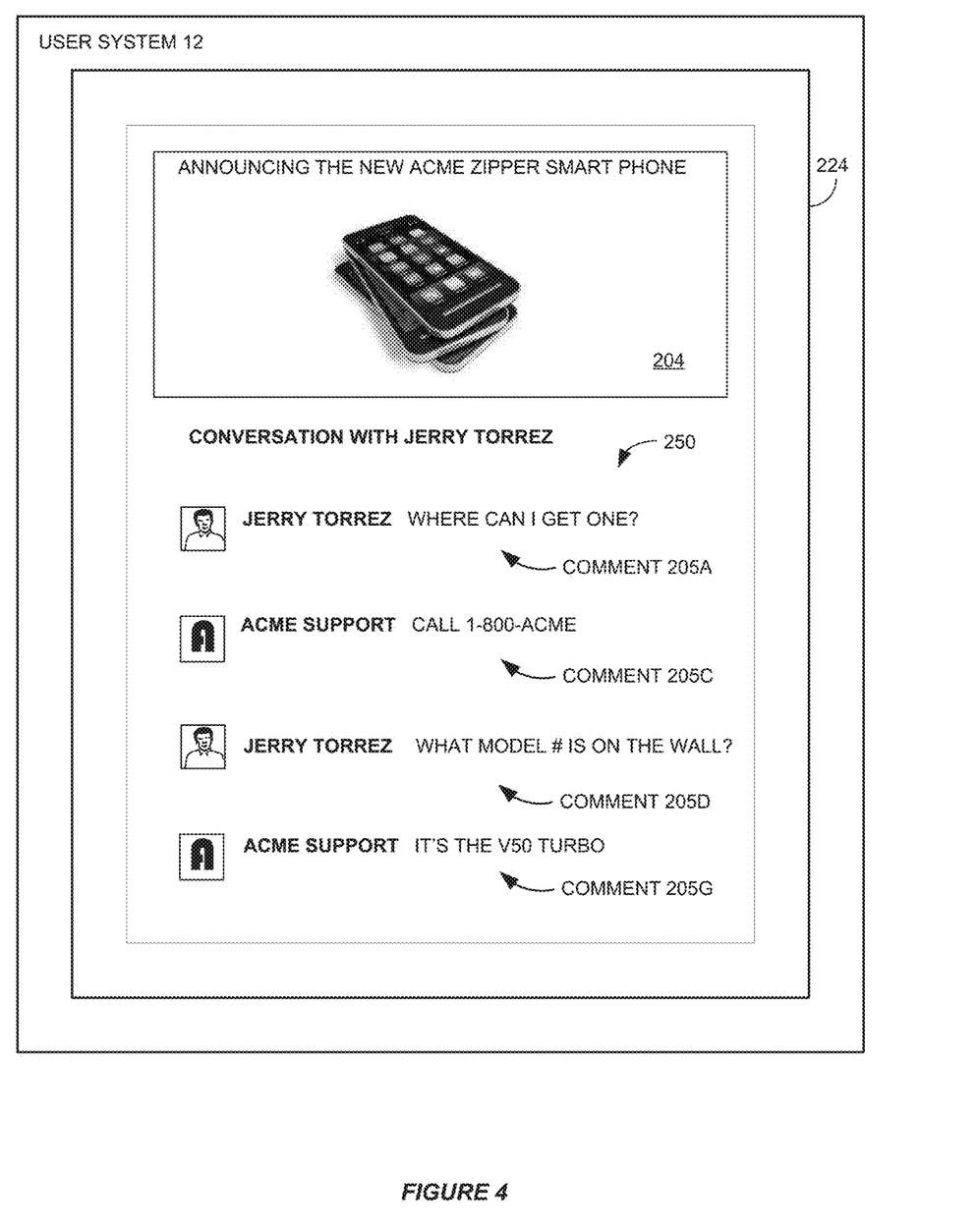
FIG. 4 shows an example support case with messages supplied by the interaction manager.

FIG. 4 depicts an example of user 1 comments automatically directed by the interaction manager into support case 224. Referring to FIGS. 3 and 4, interaction manager 210 directs user 1 comment 205A into support case 224 in response to the support agent selecting customer support icon 215A. The support agent then selected reply icon 216A to send reply comment 205C to support case 224.

Interaction manager 210 set timer 212 when the support agent selected customer support icon 215A and reset timer 212 when the support agent selected reply icon 216A. Interaction manger 210 automatically directed a next user 1 comment 205D into support case 224 since comment 205D was within the user 1 timer window set in timer 212.

The timer may be reset due to other mechanisms, not limited to the addition of a post to a case or a comment being made. For example, an authorized user could immediately expire the timer if they decide that the interactions are no longer of sufficient quality to engage in (the social media poster has grown toxic in the interactions, for example)

In this example, user 1 posted comment 205F after the time window expired for timer 212. Accordingly, interaction manager 210 did not send user 1 comment 205F to support case 224. In this example, comment 205F did not include content warranting a support agent a reply comment.

Interaction manager 210 detects comments tagged by the support agent as relevant and detects replies to comments sent by the support agent. Interaction manager 210 then, for a certain time period, sends subsequent comments 205 authored the same user to support case 224. This interaction management scheme sends the likely relevant comments 205 from social media websites 240 to associated support cases 224.

Figure 5:
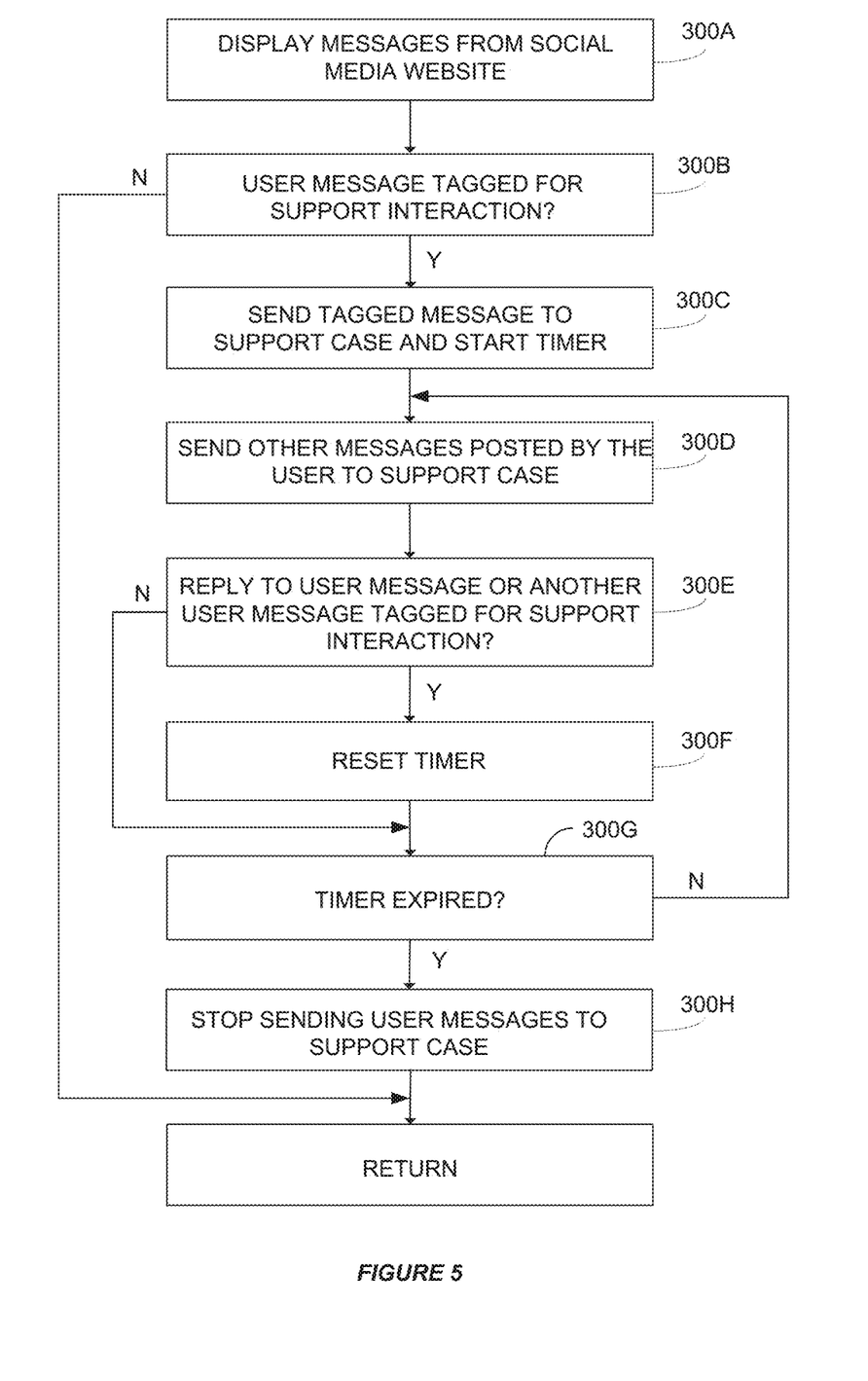
FIG. 5 shows an example process performed by the interaction manager.

FIG. 5 shows on example process performed by the interaction manager. In operation 300A, the interaction manager may display messages posted on the social media website. For example, the interaction manager may display on a user interface all messages posted by all users on one or more selected social media websites.

In operation 300B, the interaction manager may receive a tagged message. For example, the support agent may select an icon displayed next to a particular message posted by a particular user. In operation 300C, the interaction manager sends the tagged message to an associated support case and may start a timer associated with the selected user. For example, the timer may count up or down a particular configurable time period or time window, such as five days.

In operation 300D, the interaction manager automatically sends other messages posted by the same user to the associated support case. For example, the interaction manager may send messages posted by the user to a file that is accessed by a CRM application in the database system.

In operation 300E, the interaction manager checks for support agent replies to messages posted by the user and checks for any other messages tagged for support interaction. If deleted, the interaction manager resets the timer in operation 300F and starts a new time window for directing messages from the user into the support case. Otherwise, the interaction manager in operation 300G checks for expiration of the timer.

In operation 300D, the interaction manager continues sending messages authored by the user to the user support case as long as the timer has not expired. When the timer expires, the interaction manager in operation 300H stops sending messages from the user to the support case. The interaction manager may restart sending message to the support case when the support agent tags or replies to another message.

Figure 6:
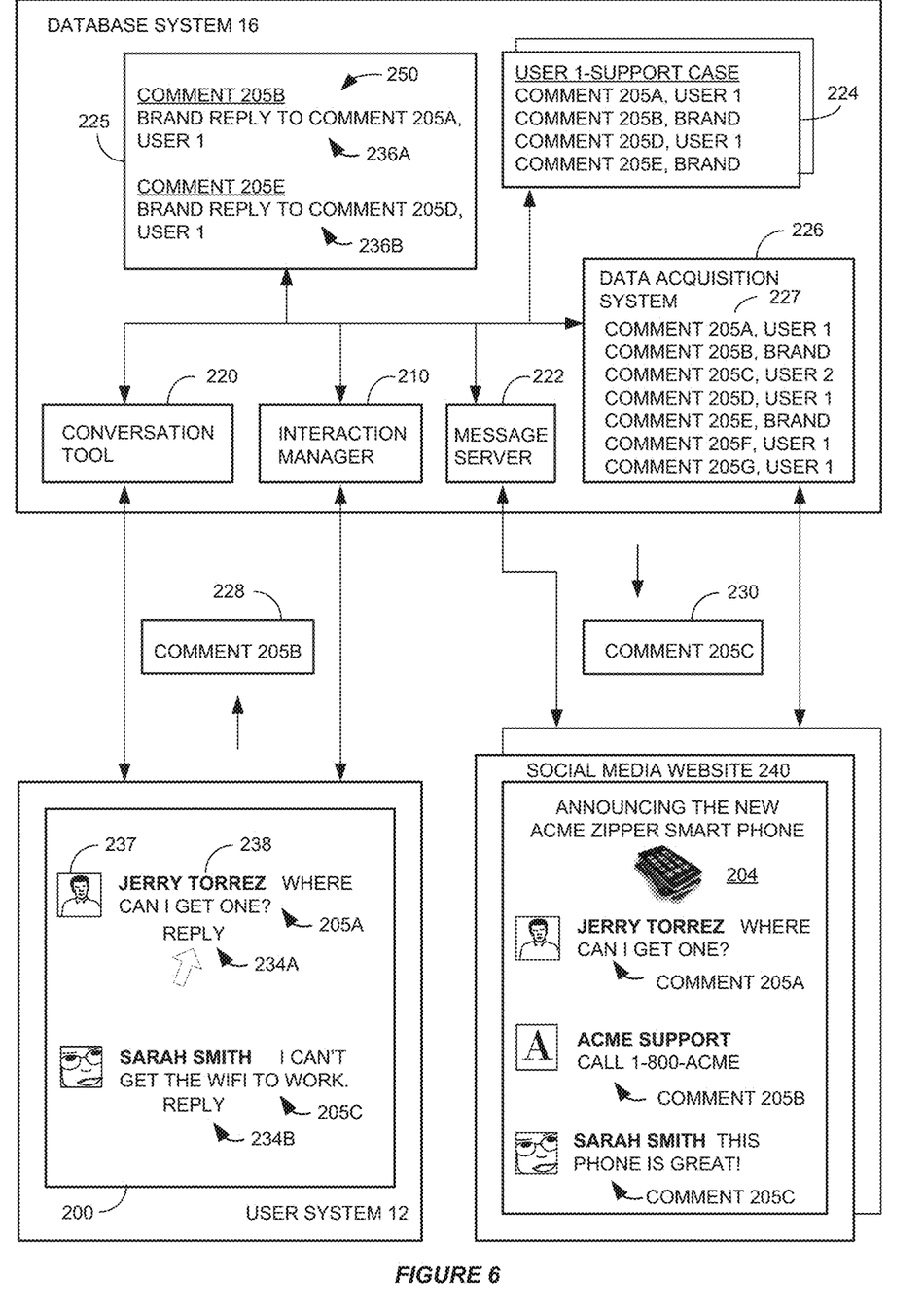
FIG. 6 shows how the interaction manager operates in conjunction with a conversation tool.

FIG. 6 shows an example of how the interaction manager may operate in conjunction with a conversation tool. Conversation tool 220 is described in co-pending patent application Ser. No. 15/167,336, entitled: IDENTIFYING CONVERSATIONS IN UNSTRUCTURED MEDIA, which is herein incorporated by reference in its entirety.

Conversation tool 220 may operate within database system 16 described above and may include any combination of software and/or hardware. Conversation tool 220 also may operate in conjunction with other software tools, such as customer relationship management (CRM) software applications or any other cloud computing application that manages client communications.

The support agent for the company posting page 204 may access conversation tool 220 via user system 12. Conversation tool 220 may display comments 205 from replicated website content 227 on user interface 200. Conversation tool 220 may display reply icons 234 adjacent to comments 205.

The agent may select one of reply icons 234 to initiate or continue a conversation with a particular user. For example, the agent may determine comment 205A from user Jerry Torrez warrants reply comment 205B. The agent may select reply icon 234A to associate reply comment 205B with user comment 205A.

In response to selecting reply icon 234A, conversation tool 220 may display a message window (not shown) for the agent to enter text, video, audio, links, documents, or any other type of data into reply comment 205B. The agent may select another icon displayed on user interface 200 to send a message 228 to conversation tool 220 that includes reply comment 205B.

Conversation tool 220 may send reply comment 205B to message server 222 for forwarding to social media website 240. Either conversation tool 220 or message server 222 may attach or otherwise associate metadata 236A with reply comment 205B. For example, conversation tool 220 may send a request to message server 222 that includes a header with an internal identifier for user comment 205A. Message server 222 may search replicated content 227 in data acquisition system 226 to determine if the header is present. If present, message server 222 may extract associated metadata 236A from comment 205A posted by user 1 (Jerry Torrez).

Metadata 236A may include any combination of an author identifier, message identifier, social media website identifier, account identifier, timestamp, etc. Message server 222 then may assign extracted metadata 236A to reply comment 205B and store reply comment 205B and metadata 236A in database store 225. Message server 222 then may send a message 230 directing social media website 240 to post reply comment 205B.

Conversation tool 220 may assign metadata 236 to other reply comments sent by the agent via user interface 200. For example, conversation tool 220 and message server 222 may assign metadata 236B to support agent reply comment 205E. Metadata 236B may identify comment 205E as a reply to another comment 205D posted by user 1 (Jerry Torrez).

Conversation tool 220 may use metadata 236 to identify and display different message conversations between the support agent and different users. For example, the agent may click on picture 237 or name 238 associated with comment 205A. In response, conversation tool 220 identifies all user comments 205 and associated reply comments associated with the selected user as a conversation 250.

For example, conversation tool 220 may search data store 224 for any reply comments 205B and 205E with metadata 236 associated with user 1 (Jerry Torrez). Conversation tool 220 then combines the identified reply comments 205B and 205E with associated user comments 205A and 205D, respectively, as a conversation 250.

Interaction manger 210 may use reply comments 205B and 205E sent to conversation tool 220 as a trigger to send user 1 comments to support case 224 and/or to reset the timer associated with user 1. Interaction manager 210 also may send the conversation 250 identified in data store 225 between the support agent and user 1 to support case 224. As long as conversation tool 220 continues to receive replies to user 1 comments, interaction manager 210 continues to reset the user 1 timer and send comments posted by user 1 to support case 224.

If the support agent stops replying to user 1 comments, conversation tool 220 may no longer add user 1 comments to conversation 250 and interaction manger 210 similarly may stop sending user 1 comments to support case 224. If the support agent starts replying again to user 1 comments, conversation tool 220 may restart conversation 250 and interaction manager 210 may restart sending user 1 comments to support case 224.

An entity may post content on multiple different social media websites 240, such as Facebook®, Twitter®, Google®, etc. Database system 16 may store replications of the social media for each of the different websites 240. The support agent may tag and reply to messages posted on any of the different social media websites 240. Interaction manager 210 then automatically sends the messages posted by the same user to an associated support case 224 in database system 16.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system comprising:
   a processor; and
   memory coupled to the processor and storing instructions that, when executed by the processor, cause the database system to perform operations comprising:
   retrieving, from a social media website via an application program interface (API), a message posted by a user on the social media website;
   causing the message posted by the user to display on a user interface of a user system in communication with the database system;
   receiving, from a support agent via the user system, a selection of the message posted by the user on the social media website and tagged for assignment to a support case in the database system;
   assigning the tagged message to the support case in the database system;
   activating a timer to measure a time period based on the receipt of the tagged message;
   identifying, during the time period, a reply to the message posted by the user; and
   resetting the time period measured by the timer in response to reply to the message posted by the user.

2. The database system of claim 1, wherein the database system receives one or more additional messages posted to the social media website by the user during the time period, and assigns the one or more additional messages to the support case in the database system.

3. The database system of claim 2, wherein the database system resets the time period measured by the timer in response to a reply to a message from the one or more additional messages.

4. The database system of claim 1, wherein retrieving the message posted by the user on the social media website includes copying the message and metadata associated with the message from an account on the social media website.

5. The database system of claim 4, wherein the metadata associated with the message includes one or more of: an author identifier, a message identifier, a social media website identifier, an account identifier, and a time stamp.

6. The database system of claim 4, wherein the database system assigns metadata associated with the message posted by the user with the reply to the message posted by the user.

7. The database system of claim 6, wherein the database system stores the reply to the message together with the metadata associated with the message in a data store.

8. The database system of claim 7, wherein the database system identifies a message conversation between the support agent and the user based on the metadata and displays the message conversation on the user interface of the user system.

9. The database system of claim 1, wherein after expiration of the time period, the database system ceases assigning messages posted by the user on the social media website to the support case.

10. The database system of claim 1, wherein the memory further stores instructions for causing the database system to perform operations comprising:

receiving, from the user system, a second selection of a second message posted by the user on the social media website and tagged for assignment to the support case;

assigning the second tagged message to the support case; and resetting the time period measured by the timer in response to receiving the second selection of the second message.

11. The database system of claim 1, wherein the one or more replies to the message posted by the user include one or more of: text, video, audio, a link, and a document.

12. The database system of claim 1, wherein the time period measured by the timer is selected based on one or more configurable criteria.

13. The database system of claim 12, wherein the one or more configurable criteria includes information associated with the user.

14. The database system of claim 1, wherein the database system sends the reply to the message posted by the user to a message server for forwarding to the social media website.

15. The database system of claim 1, wherein the selection of the message posted by the user on the social media website is received from a first support agent via a first user system, and wherein the reply to the message posted by the user is received from a second support agent via a second user system.

16. The database system of claim 1, wherein the memory further stores instructions for causing the database system to perform operations comprising:

receiving an instruction from the support agent via the user system to expire the timer; and terminating the timer in response to the instruction from the support agent.

17. The database system of claim 16, wherein the database system ceases assigning messages posted by the user on the social media website to the support case after termination of the timer.

18. The database system of claim 1, wherein the memory further stores instructions for causing the database system to perform operations comprising:

determining that the tagged message has been deleted; and resetting the timer in response to determining the tagged message has been deleted.

19. A tangible, non-transitory computer-readable medium storing instructions that, when executed by a database system, cause the database system to perform operations comprising:

retrieving, from a social media website via an application program interface (API), a message posted by a user on the social media website;

causing the message posted by the user to display on a user interface of a user system in communication with the database system;

receiving, from a support agent via the user system, a selection of the message posted by the user on the social media website and tagged for assignment to a support case in the database system;

assigning the tagged message to the support case in the database system;

activating a timer to measure a time period based on the receipt of the tagged message;

identifying, during the time period, a reply to the message posted by the user; and resetting the time period measured by the timer in response to reply to the message posted by the user.

20. A method comprising:

retrieving, by a database system from a social media website via an application program interface (API), a message posted by a user on the social media website;

causing, by the database system, the message posted by the user to display on a user interface of a user system in communication with the database system;

receiving, by the database system from a support agent via the user system, a selection of the message posted by the user on the social media website and tagged for assignment to a support case in the database system;

assigning, by the database system, the tagged message to the support case in the database system;

activating, by the database system, a timer to measure a time period based on the receipt of the tagged message;

identifying, by the database system during the time period, a reply to the message posted by the user; and resetting, by the database system, the time period measured by the timer in response to reply to the message posted by the user.

* * * * *